United States Patent
Heo et al.

(10) Patent No.: US 9,413,192 B2
(45) Date of Patent: Aug. 9, 2016

(54) MOBILE DEVICE

(71) Applicant: ROHM CO., LTD., Ukyo-Ku, Kyoto (JP)

(72) Inventors: YongMoo Heo, Kyoto (JP); Masashi Horimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/750,292

(22) Filed: Jun. 25, 2015

(65) Prior Publication Data
US 2015/0380976 A1     Dec. 31, 2015

(30) Foreign Application Priority Data
Jun. 25, 2014    (JP) ................. 2014-130715

(51) Int. Cl.
| | |
|---|---|
| *H04M 1/00* | (2006.01) |
| *H02J 7/02* | (2016.01) |
| *H04W 88/02* | (2009.01) |
| *H02J 7/00* | (2006.01) |

(52) U.S. Cl.
CPC ............ *H02J 7/025* (2013.01); *H02J 7/027* (2013.01); *H02J 50/80* (2016.02); *H04W 88/02* (2013.01); *H02J 2007/0096* (2013.01)

(58) Field of Classification Search
USPC ................... 455/573, 550.1, 343.1–343.6
See application file for complete search history.

(56) References Cited

U.S. PATENT DOCUMENTS

| | | | | |
|---|---|---|---|---|
| 8,358,104 | B2* | 1/2013 | Capomaggio | G06K 7/0008 320/108 |
| 8,798,537 | B2* | 8/2014 | Lee | H02J 17/00 455/343.1 |
| 9,300,147 | B2* | 3/2016 | Lee | H02J 7/00 |
| 2012/0329405 | A1* | 12/2012 | Lee | H02J 17/00 455/73 |
| 2014/0306657 | A1* | 10/2014 | Lundgren | H02J 7/025 320/108 |
| 2014/0312833 | A1* | 10/2014 | Won | H04B 5/0037 320/108 |
| 2014/0368053 | A1* | 12/2014 | Lee | H01F 38/14 307/104 |
| 2015/0008756 | A1* | 1/2015 | Lee | H02J 17/00 307/104 |
| 2015/0078461 | A1* | 3/2015 | Lee | H04B 5/0031 375/256 |
| 2015/0310722 | A1* | 10/2015 | Sousa | H02J 7/025 307/104 |
| 2015/0372493 | A1* | 12/2015 | Sankar | H02J 5/005 307/104 |

FOREIGN PATENT DOCUMENTS

| | | |
|---|---|---|
| JP | 5071574 B1 | 11/2012 |
| JP | 2013038854 A | 2/2013 |

* cited by examiner

*Primary Examiner* — Fayyaz Alam
(74) *Attorney, Agent, or Firm* — Cantor Colburn LLP

(57) ABSTRACT

A mobile device is configured such that it can be charged using an electric power signal S2 received from a wireless power transmitter. A wireless power receiver receives the electric power signal S2. A charger circuit charges a secondary battery using the electric power received by the wireless power receiver. A sensor detects whether or not the mobile device has been moved from a charging stand after the wireless power receiver transmits, to the wireless power transmitter, an EPT (End of Power Transfer) packet that indicates that charging of the secondary battery has been completed.

19 Claims, 8 Drawing Sheets

MOBILE DEVICE

CROSS REFERENCE TO RELATED APPLICATIONS

The present invention claims priority under 35 U.S.C. §119 to Japanese Application No. 2014-130715, filed Jun. 25, 2014, the entire content of which is incorporated herein by reference.

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

A wireless power supply that conforms to the Qi standard makes use of electromagnetic induction between a transmission coil and a reception coil. FIG. 1 is a diagram showing a configuration of a wireless power supply system 10 that conforms to the Qi standard. The power supply system 10 includes a power transmitter 20 (TX, Power Transmitter) and a power receiver 30r (RX, Power Receiver). The power receiver 30r is mounted on an electronic device such as a cellular phone terminal, smartphone, audio player, game machine, tablet terminal, or the like.

The power transmitter 20 includes a transmission coil (primary coil) 22, a driver 24, a controller 26, and a demodulator 28. The driver 24 includes an H-bridge (full-bridge) circuit or otherwise a half-bridge circuit. The driver 24 applies a driving signal S1, and specifically a driving signal S1 in the form of a pulse signal, to the transmission coil 22 such that a driving current flows through the transmission coil 22, thereby generating an electric power signal S2 in the form of an electromagnetic field signal. The controller 26 integrally controls the overall operation of the power transmitter 20. Specifically, the controller 26 controls the switching frequency of the driver 24 or otherwise the duty ratio of the switching of the driver 24 so as to adjust the electric power to be transmitted.

In the Qi standard, a protocol is defined for communication between the power transmitter 20 and the power receiver 30r, which enables information transmission from the power receiver 30r to the power transmitter 20 via a control signal S3. The control signal S3 is transmitted from a reception coil 32 (secondary coil) to the transmission coil 22 in the form of an AM (Amplitude Modulation) modulated signal using backscatter modulation. The control signal S3 includes electric power control data (which will also be referred to as a "packet") which controls an amount of electric power to be supplied to the power receiver 30r, and data which indicates the identifying information for the power receiver 30r. The demodulator 28 demodulates the control signal S3 included in the current or otherwise the voltage applied to the transmission coil 22. The controller 26 controls the driver 24 based on the power control data included in the control signal S3 thus demodulated.

The power receiver 30r includes the reception coil 32, a rectifier circuit 34, a smoothing capacitor 36, a charger circuit 38, a controller 40, and a modulator 42. The reception coil 32 receives the electric power signal S2 from the transmission coil 22, and transmits the control signal S3 to the transmission coil 22. The rectifier circuit 34 and the smoothing capacitor 36 rectify and smooth a current S4 induced at the reception coil 32 according to the electric power signal S2, thereby converting the current S4 into a DC voltage.

Using electric power supplied from the power transmitter 20, the charger circuit 38 charges a secondary battery 50. The charger circuit 38 includes a converter that steps up or otherwise steps down the DC voltage $V_{RECT}$. The charger circuit 38 supplies the DC voltage thus stepped up or stepped down to the controller 40 and other components such as the secondary battery 50.

The controller 40 monitors the electric power supplied to the secondary battery 50, and generates electric power control data to be used to control the amount of electric power supplied from the power transmitter 20. The modulator 42 modulates the control signal S3 including the electric power control data so as to modulate the coil current that flows through the reception coil 32, thereby modulating the coil current and coil voltage applied to the transmission coil 22.

FIG. 2 is a flowchart (state transition diagram) showing the power supply system 10 shown in FIG. 1. Description will be made assuming that the following five phases are defined.

$\phi1$: Selection phase
$\phi2$: Ping phase
$\phi3$: Identification and configuration phase
$\phi4$: Negotiation phase
$\phi5$: Power transfer phase In the selection phase $\phi1$, the power transmitter 20 detects the presence or absence of the power receiver 30r. Specifically, the power transmitter 20 applies a current to the transmission coil 22 at predetermined intervals (e.g., at intervals of 5 ms). The current that flows through the transmission coil 22 varies depending on whether or not the reception coil 32 exists in the vicinity of the transmission coil 22. The power transmitter 20 uses this mechanism to judge whether or not the power receiver 30r is placed on a charging stand. Such a judgment operation will be referred to as the "analog ping operation".

When the power receiver 30r is detected, the phase transits to the ping phase $\phi2$. In the ping phase $\phi2$, the power transmitter 20 executes a digital ping operation, and waits for a response from the power receiver 30r. In the digital ping operation, the electric power to be transmitted is maintained at a constant level, and the power receiver 30r operates using the electric power signal S2 received from the power transmitter 20 as a power supply.

In the subsequent identification and configuration phase $\phi3$, the power transmitter 20 identifies the power receiver 30r, and performs settings with respect to the electric power to be transmitted or the like.

In the negotiation phase $\phi4$, the electric power to be transmitted or the like is reconfigured. In the power transfer phase $\phi5$, electric power is transferred based on the information thus configured.

When the secondary battery 50 becomes the full charge state on the power receiver 30r side, the controller 40 generates an EPT (End of Power Transfer) packet, and transmits the EPT packet thus generated to the power transmitter 20.

After the power transmitter 20 receives the EPT packet, the power transmitter 20 stops the power supply operation. However, a protocol to automatically restart the charging operation is not defined. That is to say, the power receiver 30r has the potential to run out of battery charge even if the power receiver 30*r* remains placed on a charging stand.

SUMMARY OF THE INVENTION

The present invention has been made in order to solve such a problem. Accordingly, it is an exemplary purpose of an embodiment of the present invention to provide a mobile device that is capable of suppressing the occurrence of running out of battery charge.

An embodiment of the present invention relates to a mobile device that can be charged using an electric power signal received from a wireless power transmitter. The mobile device comprises: a secondary battery; a wireless power receiver that receives the electric power signal; a charger circuit that charges the secondary battery using electric power received by the wireless power receiver; and a sensor that detects whether or not the mobile device has been moved from a charging stand after the wireless power receiver transmits, to the wireless power transmitter, an EPT (End of Power Transfer) packet that indicates that charging of the secondary battery has been completed.

With such an embodiment, the terminal is capable of independently detecting whether or not the mobile device remains on the charging stand after the battery charging is completed. Thus, such an arrangement may use such a detection result as a trigger for restarting the battery charging.

Also, the mobile device may further comprise a notifying unit that notifies a user of the mobile device when the mobile device remains placed on the charging stand after the EPT packet is transmitted.

This allows the user who has received a notice to perform a particular action in order to restart the battery charging for the mobile device. Thus, such an arrangement prevents the mobile device from becoming inoperative due to running out of battery charge without the user being aware of it.

Also, the sensor may comprise a magnetic sensor.

The magnetic sensor may detect the geomagnetic data so as to detect whether or not the casing of the mobile device has been moved. Also, the magnetic sensor may detect a change in the magnetic field generated by the transmission coil of the wireless power transmitter so as to detect whether or not the casing of the mobile device has been moved.

Also, the sensor may include at least one from among a magnetic sensor, an acceleration sensor, a gyro sensor, a touch sensor, a touch panel, a physical button, a camera, and an illumination sensor.

Also, the sensor may detect an electromagnetic field signal that occurs due to an analog ping generated by the wireless power transmitter.

When the wireless power transmitter applies a current to the transmission antenna in order to generate an analog ping, an electromagnetic field is generated according to the current that flows through the transmission antenna. Thus, by monitoring by means of the sensor whether or not such an electromagnetic field is generated in a cyclic manner, such an arrangement is capable of judging whether or not the mobile device remains on the charging stand.

Also, the notifying unit may prompt the user of the mobile device to place the mobile device on the charging stand again after detaching the mobile device from the charging stand.

Also, the notifying unit may instruct a display apparatus to display a message that prompts the user of the mobile device to place the mobile device on the charging stand again after detaching the mobile device from the charging stand.

Also, the notifying unit my output a notice in the form of a voice or a sound that the mobile device has been left on the charging stand.

Also, the notifying unit may vibrate the mobile device.

Also, the notifying unit may notify the user of the mobile device after a predetermined period of time elapses after the EPT packet is transmitted.

Also, the notifying unit may notify the user of the mobile device when the remaining battery charge becomes smaller than a predetermined threshold value after the EPT packet is transmitted.

Also, the mobile device may conform to the Qi standard.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 3:
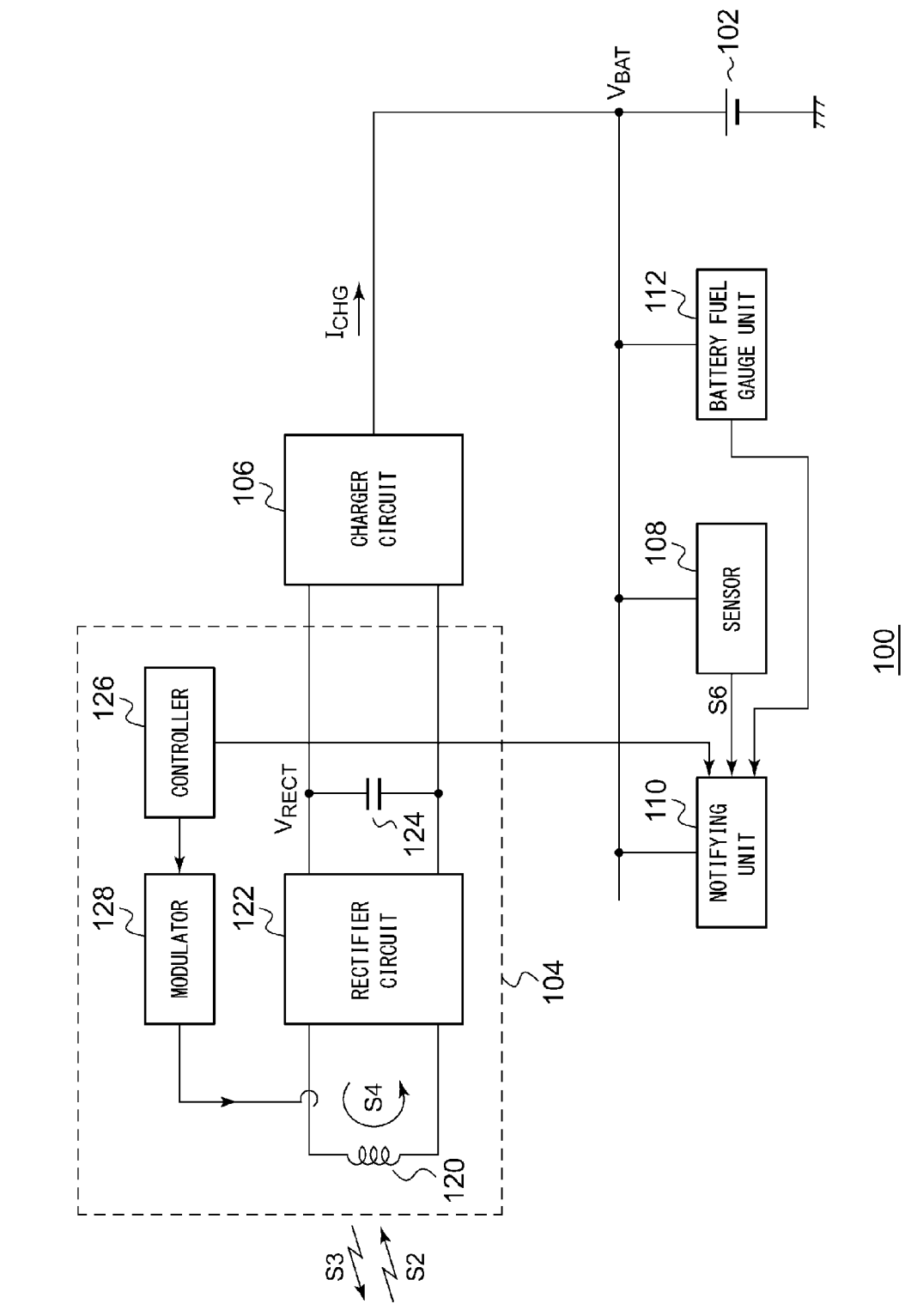
FIG. 3 is a block diagram showing a mobile device according to an embodiment.

FIG. 3 is a block diagram showing a mobile device 100 according to an embodiment. The mobile device 100 is configured as a cellular phone terminal, smartphone, audio player, game machine, tablet terminal, or the like.

Figure 1:
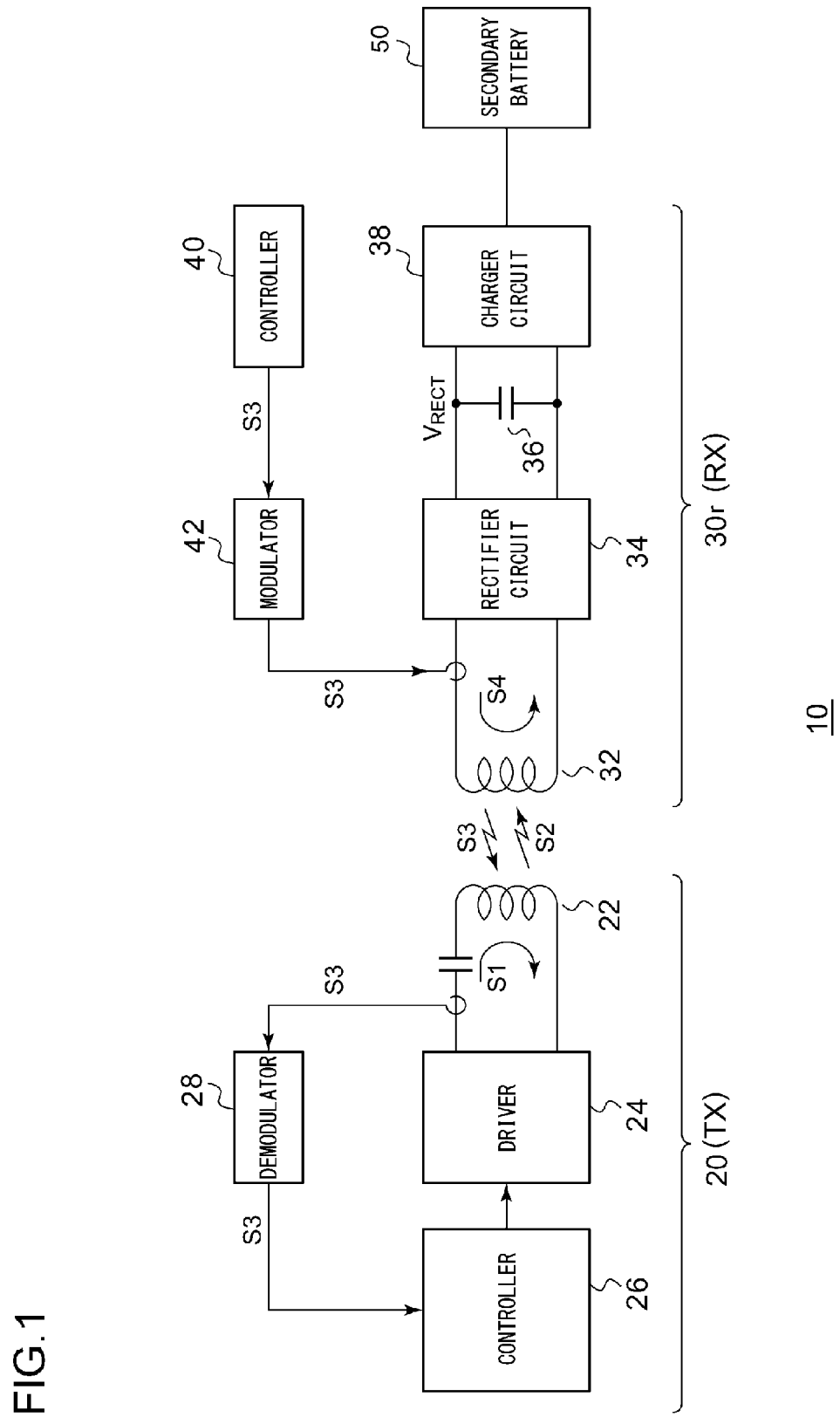
FIG. 1 is a diagram showing a configuration of a wireless power supply system that conforms to the Qi standard.
Figure 2:
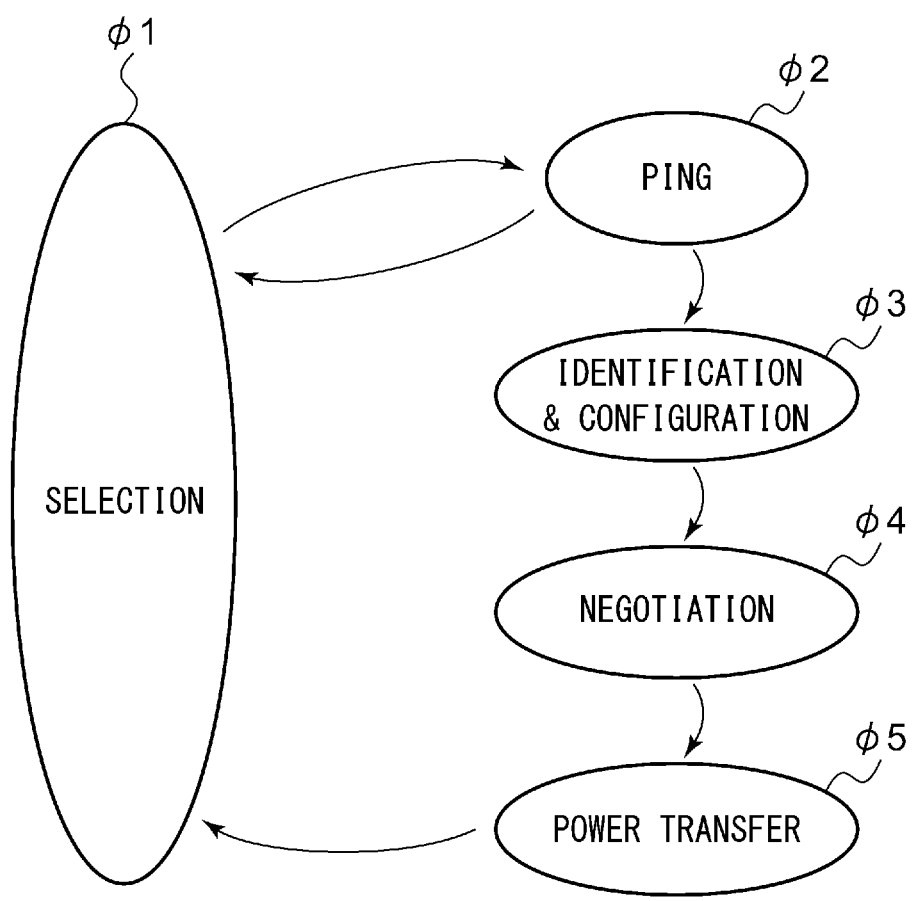
FIG. 2 is a flowchart (state transition diagram) showing the operation of the power supply system shown in FIG. 1.

The mobile device 100 is configured as a battery-driven device, and is configured to be capable of charging its battery using the electric power signal S2 received from the power transmitter 20 shown in FIG. 1. The mobile device 100 includes a secondary battery 102, a power receiver 104, a charger circuit 106, a sensor 108, a notifying unit 110, and a battery fuel gauge unit 112. Description will be made assuming that the mobile device 100 conforms to the Qi standard.

The power receiver 104 receives the electric power signal S2, and rectifies the electric power signal S2 so as to generate a rectified DC voltage $V_{RECT}$. The power receiver 104 includes a reception coil 120, a rectifier circuit 122, a smoothing capacitor 124, a controller 126, and a modulator 128. The reception coil 120 receives the electric power signal S2, and transmits a control signal S3 to a transmission coil 202. The rectifier circuit 122 and the smoothing capacitor 124 operate together so as to rectify and smooth the current S4 induced at the reception coil 120 according to the electric power signal S2, so as to convert the current S4 into the DC voltage $V_{RECT}$.

The controller 126 monitors the electric power supplied to a load of the power receiver 104. Based on the monitoring result, the controller 126 generates electric power control data for controlling an amount of electric power to be supplied from the power transmitter 20. The modulator 128 modulates the control signal S3 including the electric power control data so as to modulate the coil current that flows through the reception coil 120. Such an arrangement allows the coil current and the coil voltage to be modulated on the transmission coil 202 side.

The charger circuit 106 charges the secondary battery 102 using electric power supplied from the power transmitter 20.

After the completion of charging the secondary battery 102, the wireless power receiver 104 transmits, to the wireless power transmitter, an EPT (End of Power Transfer) packet which is an instruction to stop the power transfer operation. After the EPT packet is transmitted, the sensor 108 detects whether or not the mobile device 100 is moved from the charging stand. When the sensor 108 detects that the mobile device 100 has been moved, the sensor 108 asserts (set to high level, for example) a movement detection signal S6.

After the EPT packet is transmitted, when the mobile device 100 remains on the charging stand, i.e., when the movement detection signal S6 remains in a negated state, the notifying unit 110 notifies the user of the mobile device 100. The battery fuel gauge unit 112 detects the remaining battery charge of the secondary battery 102. The power receiver 104 and the charger circuit 106 each operate using the electric power signal S2 received from the power transmitter 20. On the other hand, the sensor 108, the notifying unit 110, and the battery fuel gauge unit 112 may operate using electric power received from the secondary battery 102.

Next, description will be made regarding the sensor 108.

Figure 4:
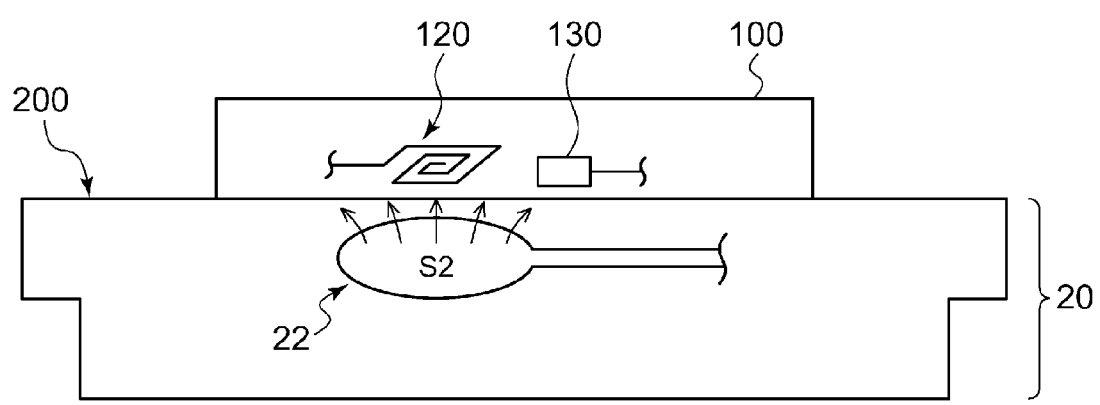
FIG. 4 is a cross-sectional diagram showing a schematic configuration of the mobile device.

FIG. 4 is a cross-sectional diagram showing a schematic configuration of the mobile device 100. The sensor 108 includes a magnetic sensor 130. The power transmitter 20 generates an analog ping in a cyclic manner, even after receiving the EPT packet. The analog ping is detected as the electromagnetic field signal S2 generated by the transmission coil 22 built into a charging stand 200. The magnetic sensor 130 monitors the electromagnetic field signal S2 generated by the transmission coil 22. Thus, such an arrangement is capable of judging whether or not the mobile device 100 has been detached from the charging stand 200.

The magnetic sensor 130 is preferably arranged in the vicinity of the reception coil 120. In order to charge the battery with high efficiency, the mobile device 100 is required to be placed on the charging stand 200 such that the reception coil 120 faces the transmission coil 22. With such an arrangement, the magnetic sensor 130 is positioned in the vicinity of the transmission coil 22, thereby providing improved efficiency of the detection of the electromagnetic field signal S2.

Figure 5:
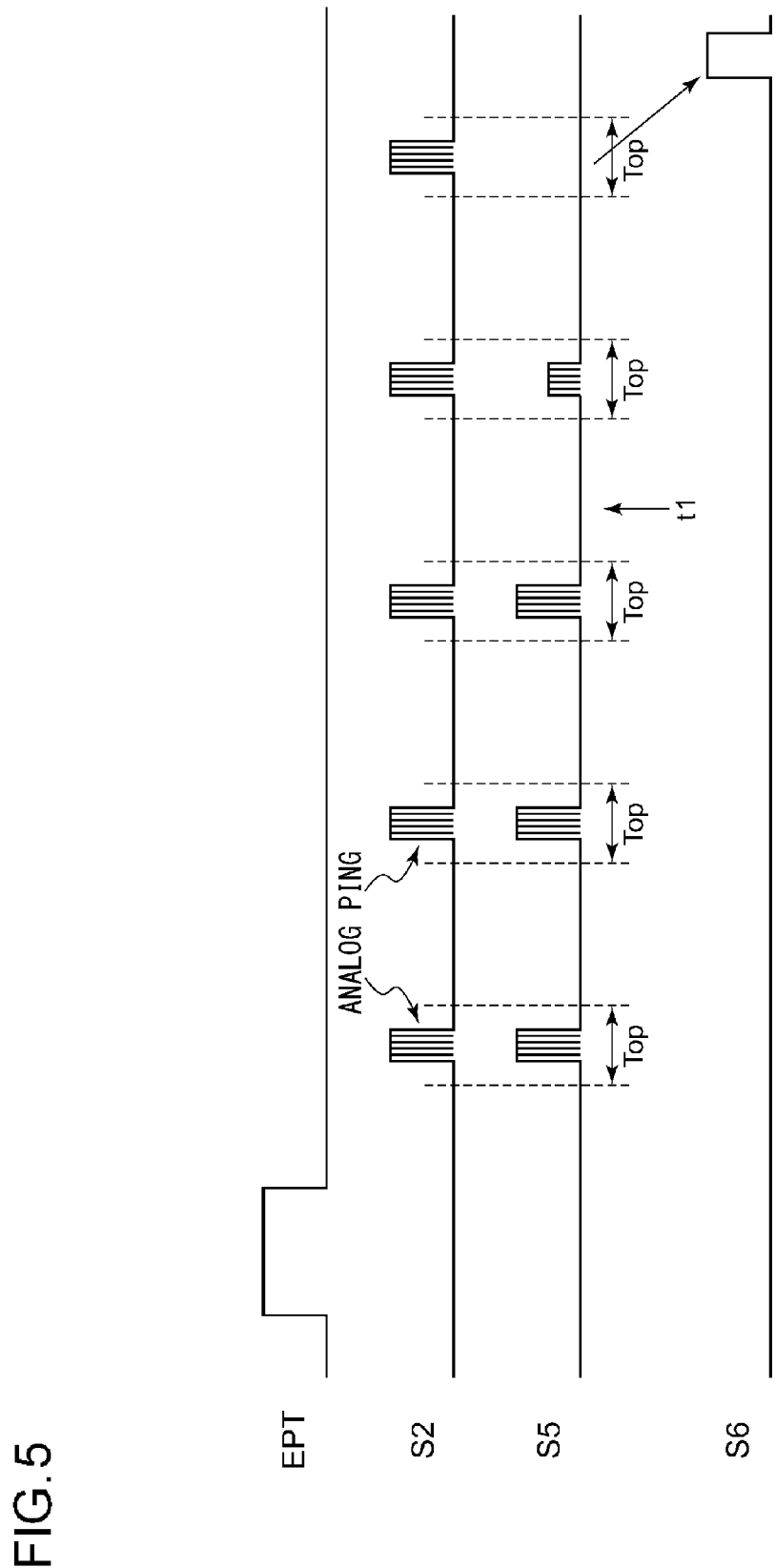
FIG. 5 is an operation waveform diagram showing the operation of the mobile device shown in FIG. 4.

FIG. 5 is an operation waveform diagram showing the operation of the mobile device 100 shown in FIG. 4. Here, S5 represents a detection signal detected by the magnetic sensor 130 corresponding to the electromagnetic field.

The power transmitter 20 executes an analog ping operation with a predetermined cycle, thereby generating the electromagnetic field signal S2. After the EPT packet is transmitted, the mobile device 100 is not moved, i.e., remains placed on the charging stand 200, until the time point t1. During a period in which the magnetic sensor 130 detects a cyclical magnetic field change S5 which corresponds to an analog ping, judgement is made that the mobile device 100 remains placed on the charging stand.

When the mobile device 100 is moved by the user at the time point t1, a cyclical magnetic field change S5 is not detected. As a result, the sensor 108 judges that the mobile device 100 has been moved from the charging stand 200, and accordingly, the sensor 108 asserts (set to high level, for example) the movement detection signal S6.

It should be noted that, in a case in which the sensor 108 operates at all times, such an arrangement requires large power consumption for the sensor 108, leading to a problem of discharging the secondary battery 102 at a high rate. In order to solve such a problem, a burst control operation is preferably performed such that the sensor 108 is set to an active state in a time sharing manner in synchronization with the analog ping generated by the power transmitter 20. FIG. 5 shows the operation period of the sensor 108, which is indicated by "Top". It should be noted that, when judgment is made that the mobile device 100 has been moved from the charging stand 200, the operation of the sensor 108 may be suspended.

Next, description will be made regarding a notice provided by the notifying unit 110.

When the mobile device 100 is moved from the charging stand 200 after the mobile device 100 has remained placed on the charging stand 200 for a long period of time after the battery charging has been completed, the notifying unit 110 prompts the user of the mobile device 100 to place the mobile device 100 on the charging stand again after detaching the mobile device 100 from the charging stand 200.

After the EPT packet is transmitted, the notifying unit 110 may notify the user when the remaining battery charge of the secondary battery 102 detected by the battery fuel gauge unit 112 becomes lower than a predetermined threshold (e.g., 80% level, 50% level, or 30% level). Also, the notifying unit 110 may notify the user when a predetermined period of time has elapsed in a state in which the mobile device 100 has remained on the charging stand 200 after the EPT packet has been transmitted. Such a predetermined period of time may preferably be determined according to the rate at which the remaining battery charge drops.

Figure 6:
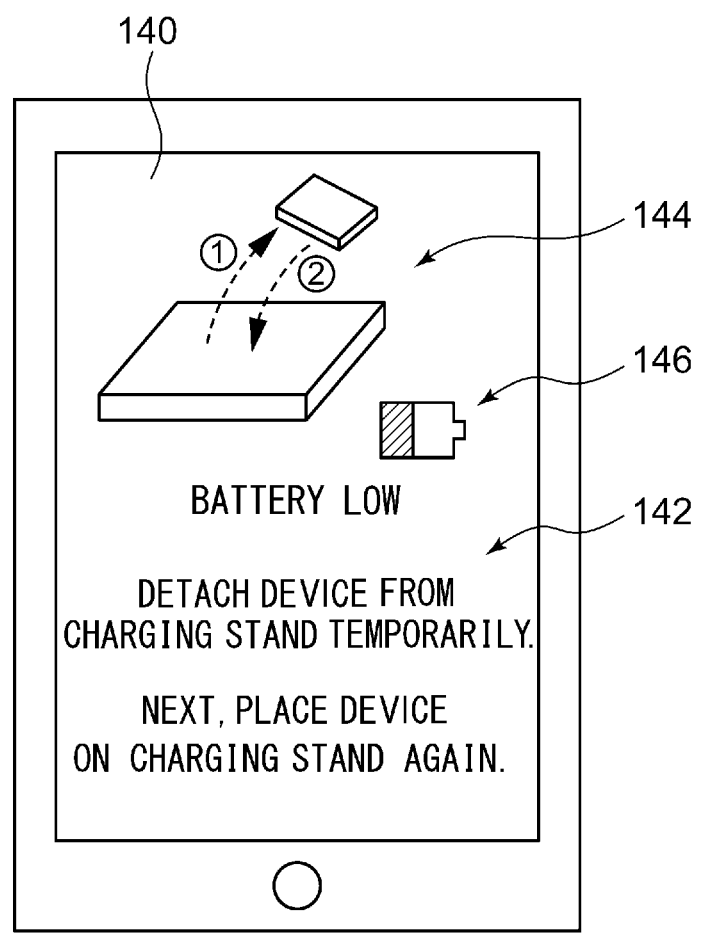
FIG. 6 is a diagram showing examples of notices provided by a display device.

FIG. 6 is a diagram showing an example of a notice provided by a display apparatus. The notifying unit 110 may use a display apparatus 140 of the mobile device 100 to display, on a screen, messages 142 and 144 that prompt the user to place the mobile deice 100 on the charging stand again after the user has detached the mobile device 100 from the charging stand. Such a message may be configured in a text form 142 or otherwise an image form 144. In addition, an icon 146 or a message may be displayed in order to indicate a warning that the remaining battery charge is low.

In addition to or instead of such a notice provided by a display, the notifying unit 110 may output an audio notice that notifies the user that the mobile device 100 has been left on the charging stand 200. Alternatively, the notifying unit 110 may vibrate the mobile device 100 using a vibration function of the mobile device 100.

Figure 7:
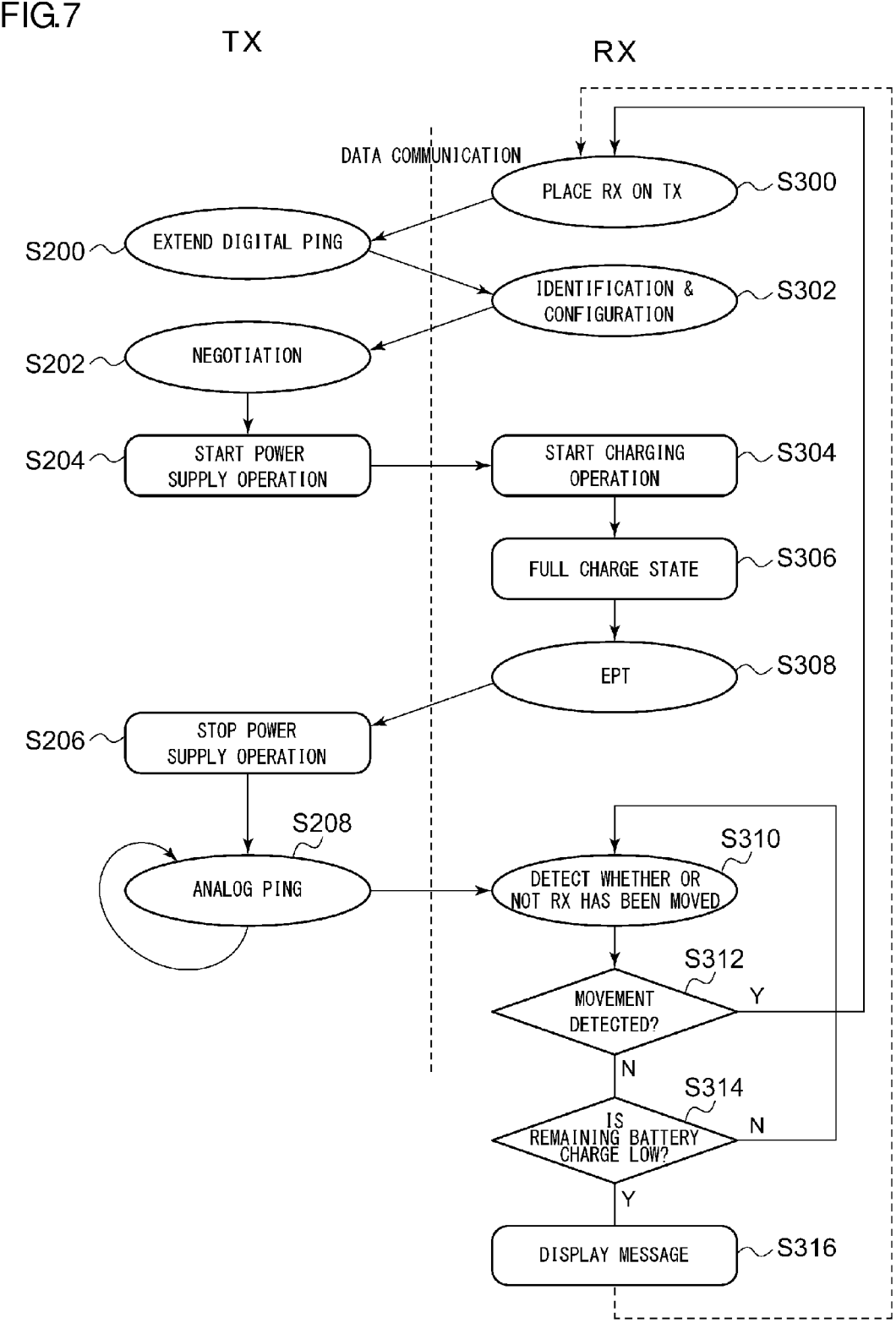
FIG. 7 is a flowchart showing the operations of the mobile device and a power transmitter shown in FIG. 3.

The above is the configuration of the mobile device 100. Next, description will be made regarding the operation thereof. FIG. 7 is a flowchart showing the operations of the mobile device 100 and the power transmitter 20 shown in FIG. 3.

The RX (mobile device 100) is placed on the TX (charging stand 200 configured as the power transmitter 20). After the extended digital ping phase (S200), identification and configuration phase (S302), and negotiation phase (S202), the power supply phase is started (S204 and S304).

After the battery charging is completed (S306), the mobile device 100 transmits an EPT packet to the power transmitter 20 (S308). After the power transmitter 20 receives the EPT packet, the power transmitter 20 suspends the power supply operation (S206). Such steps described above are the same as those for a power supply system 10 that conforms to the Qi standard according to a conventional technique.

After the power supply is suspended, the power transmitter 20 continues an analog ping operation (S208) with a predetermined cycle. The magnetic sensor 130 of the mobile device 100 monitors the electromagnetic field signal S2 accompanying the analog ping operation, and judges whether or not the mobile device 100 has been moved from the charging stand 200 (S310). As a result, when the magnetic sensor 130 detects that the mobile device 100 has been moved (YES in S312), the charging sequence is suspended. When the user places the mobile device 100 on the charging stand 200 again, the flow returns to S300, and the same sequence is repeated.

Even when the magnetic sensor 130 does not detect that the mobile device 100 has been moved (NO in S312), when the remaining battery charge is higher than a predetermined threshold value (NO in S314), the flow returns to S310, and the magnetic sensor 130 continues the monitoring of whether or not the mobile device 100 has been moved. When a state (S312) continues in which the magnetic sensor 130 does not detect that the mobile device 100 has been moved, and when the remaining battery charge becomes lower than the threshold value (YES in S314) in this state, the notifying unit 110 displays a message (S316). Upon seeing the message thus displayed, the user temporarily detaches the mobile device 100 from the charging stand 200, and places the mobile device 100 on the charging stand 200 again. In this state, the flow returns to Step S300, thereby restarting the battery charging.

The above is the operation of the power supply system 10 including the mobile device 100.

With such a mobile device 100, when the mobile device 100 has been left on the charging stand 200 after the battery charging is completed, such an arrangement is capable of notifying the user. Thus, the user can perform an action so as to restart the charging of the mobile device 100. This prevents the mobile device 100 from becoming inoperative due to running out of battery charge without the user being aware of it.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

The following modifications may be made for the sensor 108 that detects whether or not the mobile device 100 has been moved.

First Modification

The sensor 108 includes a magnetic sensor (geomagnetic sensor) in the same manner as in the embodiment. The magnetic sensor measures the geomagnetic data, and monitors whether or not there is a change in the orientation of a casing of the mobile device 100. With such an arrangement, during a period in which there is no change in the orientation of the casing, judgment is made that the mobile device 100 remains placed on the charging stand. When there is a change in the orientation of the casing, judgment is made that the mobile device 100 has been detached from the charging stand, and the movement detection signal S6 is asserted.

Second Modification

The sensor 108 includes an acceleration sensor or otherwise a gyro sensor. The acceleration sensor or gyro sensor measures the acceleration due to detachment or rotation of the casing. During a period in which the mobile device 100 remains placed on the charging stand, significant acceleration is not measured. When the user moves the mobile device 100 from the charging stand, a change in acceleration is measured. When the sensor 108 detects that the mobile device 100 has been moved, the sensor 108 asserts the movement detection signal S6.

Third Modification

The sensor 108 includes a touch sensor or otherwise a touch panel. After the mobile device 100 is placed on the charging stand 200 in order to charge the battery, the user is unlikely to input data via a touch sensor or otherwise a touch panel before the user intentionally operates the mobile device 100. Thus, the sensor 108 monitors whether or not the user has input data via a touch sensor or a touch panel. When the sensor 108 detects that the user has input data, the sensor 108 asserts the movement detection signal S6 assuming that the mobile device 100 has been moved.

For the same reason, the sensor 108 may include a physical button. Such a physical button may be configured as a home button or a volume button. The sensor 108 monitors whether or not the user has pressed the physical button. When the sensor 108 detects that the user has pressed the physical button, the sensor 108 may assert the movement detection signal S6 assuming that the mobile device 100 has been moved.

Fourth Modification

The sensor 108 includes a camera. The sensor 108 monitors an image acquired by the camera. By making a comparison between an image acquired in the power receiving operation before the EPT packet is transmitted and an image acquired after the EPT packet is transmitted, the sensor 108 may detect whether or not the mobile device 100 has been moved.

Fifth Modification

The sensor 108 may include an illuminance sensor. By making a comparison between the illumination level measured before the EPT packet is transmitted and the illumination level measured after the EPT packet is transmitted, the sensor 108 may detect whether or not the mobile device 100 has been moved.

In many cases, the mobile device 100 such as a smartphone mounts an acceleration sensor, a gyro sensor, a touch sensor, a touch panel, and an illumination sensor for other purposes. Thus, such a sensor originally provided to such a mobile device 100 may also be used to judge whether or not the mobile device 100 has been detached from the charging stand 200, thereby suppressing an increase in costs.

It should be noted that the detection method of whether or not the mobile device 100 has been moved is not restricted to such arrangements. Also, the sensor 108 may be implemented with an arbitrary combination of the aforementioned movement detection means.

Sixth Modification

Description has been made in the embodiment regarding an arrangement in which the user performs a particular action in order to restart the battery charging, in which the user temporarily detaches the mobile device 100 from the charging stand 200 and places the mobile device 100 on the charging stand 200 again. However, the present invention is not restricted to such an arrangement.

For example, the power transmitter 20 is provided with a reset function that allows the battery charging to be restarted after the EPT packet is received. For example, the power transmitter 20 may be provided with a reset button. With such an arrangement, when the user who has received a notice presses the reset button, the power transmitter 20 may restart the sequence from the digital ping phase 5200 shown in FIG. 7.

Also, a reset packet, which is used to instruct the power transmitter 20 to restart the battery charging, may be defined between the power transmitter 20 and the mobile device 100. Instead of notifying the user, the notifying unit 110 may transmit such a reset packet to the power transmitter 20. Upon reception of the reset packet, the power transmitter 20 may automatically restart the battery charging.

Seventh Modification

Description has been made in the embodiment regarding a wireless power transmitter that conforms to the Qi standard. However, the present invention is not restricted to such an arrangement. Also, the present invention is applicable to a mobile device 100 that conforms to a standard similar to the Qi standard, and a mobile device 100 that conforms to a standard developed in the future.

Figure 8:
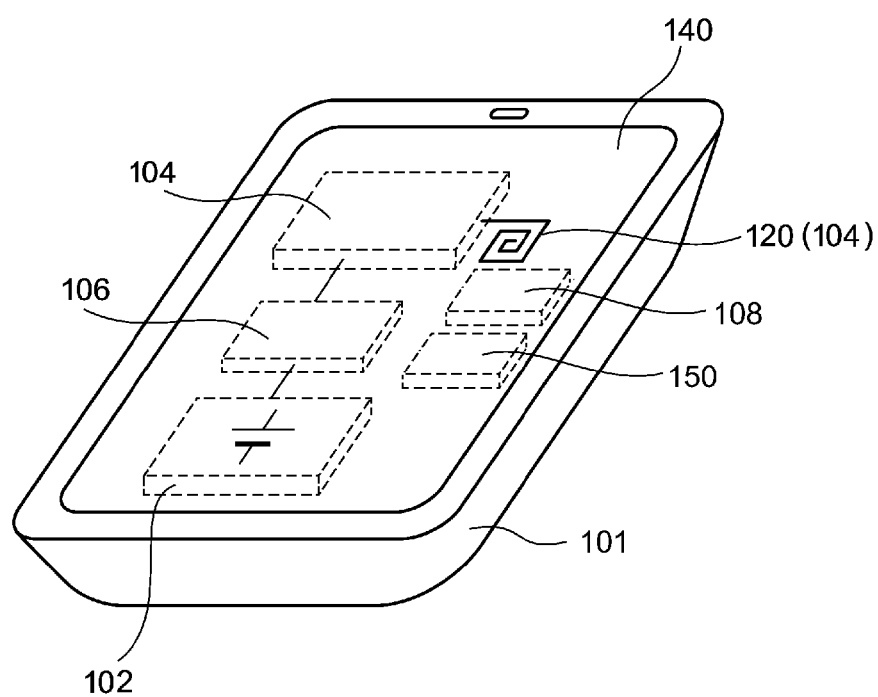
FIG. 8 is a diagram showing the mobile device according to the embodiment.

Lastly, description will be made regarding a specific example of the electronic device. FIG. 8 is a diagram showing the mobile device 100 according to the embodiment. The mobile device 100 shown in FIG. 8 is configured as a smartphone, a tablet PC, a portable game machine, or a portable audio player. A casing 101 houses, as the built-in components, the secondary battery 102, the power receiver 104, the charger circuit 106, the sensor 108, the display apparatus 140, and the processor 150. The processor 150 may include a wireless communication (RF) unit, a baseband processor, an application processor, an audio processor, or the like. The function of the notifying unit 110 may be provided by the processor 150.

While the preferred embodiments of the present invention have been described using specific terms, such description is for illustrative purposes only, and it is to be understood that changes and variations may be made without departing from the spirit or scope of the appended claims.

What is claimed is:

1. A mobile device that can be charged using an electric power signal received from a wireless power transmitter, the mobile device comprising:
   a secondary battery;
   a wireless power receiver that receives the electric power signal;
   a charger circuit that charges the secondary battery using electric power received by the wireless power receiver; and
   a sensor that detects whether or not the mobile device has been moved from a charging stand after the wireless power receiver transmits, to the wireless power transmitter, an EPT (End of Power Transfer) packet that indicates that charging of the secondary battery has been completed.

2. The mobile device according to claim 1, further comprising a notifying unit that notifies a user of the mobile device when the mobile device remains placed on the charging stand after the EPT packet is transmitted.

3. The mobile device according to claim 1, wherein the sensor comprises a magnetic sensor.

4. The mobile device according to claim 1, wherein the sensor comprises an acceleration sensor.

5. The mobile device according to claim 1, wherein the sensor comprises a gyro sensor.

6. The mobile device according to claim 1, wherein the sensor comprises a touch sensor.

7. The mobile device according to claim 1, wherein the sensor comprises a touch panel.

8. The mobile device according to claim 1, wherein the sensor comprises a physical button.

9. The mobile device according to claim 1, wherein the sensor comprises a camera.

10. The mobile device according to claim 1, wherein the sensor comprises an illumination sensor.

11. The mobile device according to claim 1, wherein the sensor detects an electromagnetic field signal that occurs due to an analog ping generated by the wireless power transmitter.

12. The mobile device according to claim 2, wherein the notifying unit prompts the user of the mobile device to place the mobile device on the charging stand again after detaching the mobile device from the charging stand.

13. The mobile device according to claim 2, wherein the notifying unit instructs a display apparatus to display a message that prompts the user of the mobile device to place the mobile device on the charging stand again after detaching the mobile device from the charging stand.

14. The mobile device according to claim 2, wherein the notifying unit outputs a notice in the form of a voice or a sound that the mobile device has been left on the charging stand.

15. The mobile device according to claim 2, wherein the notifying unit vibrates the mobile device.

16. The mobile device according to claim 2, wherein the notifying unit notifies the user of the mobile device after a predetermined period of time elapses after the EPT packet is transmitted.

17. The mobile device according to claim 2, wherein the notifying unit notifies the user of the mobile device when the remaining battery charge becomes smaller than a predetermined threshold value after the EPT packet is transmitted.

18. The mobile device according to claim 1, that conforms to the Qi standard.

19. A control method for a mobile device that can be charged using an electric power signal received from a wireless power transmitter, the control method comprising:
- receiving the electric power signal from the wireless power transmitter;
- charging a secondary battery using the electric power thus received;
- transmitting an EPT (End of Power Transfer) packet to the wireless power transmitter when charging of the secondary battery has been completed;
- detecting whether or not the mobile device has been moved from a charging stand after the EPT packet is transmitted; and
- notifying a user of the mobile device when the mobile device remains on the charging stand after the EPT packet is transmitted.

\* \* \* \* \*